(12) United States Patent
Rejaly et al.

(10) Patent No.: US 9,356,726 B2
(45) Date of Patent: May 31, 2016

(54) MODULO CHANNEL ASSIGNMENT TECHNIQUE IN OPTICAL POINT TO MULTIPOINT NETWORKS TO PREVENT OPTICAL BEAT INTERFERENCE

(71) Applicant: Aurora Networks, Inc., San Jose, CA (US)

(72) Inventors: Daryoosh Rejaly, Mountain House, CA (US); Ketan Gadkari, San Jose, CA (US); Zulfikar Morbi, San Jose, CA (US); Sudhesh Mysore, Carlsbad, CA (US); Steve Hopkins, Union City, CA (US)

(73) Assignee: Aurora Networks, Inc., San Jose, CA (US)

( * ) Notice: Subject to any disclaimer, the term of this patent is extended or adjusted under 35 U.S.C. 154(b) by 0 days.

(21) Appl. No.: 14/686,023

(22) Filed: Apr. 14, 2015

(65) Prior Publication Data

US 2016/0013881 A1    Jan. 14, 2016

Related U.S. Application Data

(60) Provisional application No. 62/023,279, filed on Jul. 11, 2014.

(51) Int. Cl.
*H04J 14/00* (2006.01)
*H04J 14/02* (2006.01)
(Continued)

(52) U.S. Cl.
CPC ......... *H04J 14/0224* (2013.01); *H04J 14/0236* (2013.01); *H04J 14/0238* (2013.01);
(Continued)

(58) Field of Classification Search
CPC .............. H04J 14/0238; H04J 14/0257; H04J 14/0247; H04J 14/0282; H04J 14/0224; H04J 14/0236; H04L 41/0896; H04Q 11/0067; H04Q 2011/0016; H04Q 2011/0086
USPC ....................................... 398/66–72
See application file for complete search history.

(56) References Cited

U.S. PATENT DOCUMENTS 6,532,220 B1 *  3/2003  Carneal .............. H04B 7/18582
                                                370/329
7,149,429 B2 * 12/2006  Ufongene ........... H04J 14/0246
                                                398/58

(Continued)

FOREIGN PATENT DOCUMENTS

EP           2403169          1/2012

OTHER PUBLICATIONS

International Search Report and Written Opinion from PCT/US2015/040668 dated Oct. 6, 2015.

*Primary Examiner* — Hibret Woldekidan
(74) *Attorney, Agent, or Firm* — John Bruckner PC (57) ABSTRACT

Configuring an optical point to multipoint communication network includes assigning a channel number $C_i$ by modular arithmetic to each of a plurality of N access points, each of the plurality of N access points i) including a laser and ii) coupled to a hub having a shared optical receiver; and tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver.

12 Claims, 4 Drawing Sheets

(51) Int. Cl.
*H04L 12/24* (2006.01)
*H04Q 11/00* (2006.01)

(52) U.S. Cl.
CPC ........ *H04L41/0896* (2013.01); *H04Q 11/0067* (2013.01); *H04Q 2011/0016* (2013.01); *H04Q 2011/0086* (2013.01)

(56) References Cited

U.S. PATENT DOCUMENTS

| | | | |
|---|---|---|---|
| 7,236,699 B2 * | 6/2007 | Beshai | H04Q 11/0005 398/45 |
| 7,877,013 B2 * | 1/2011 | Effenberger | H04J 14/0226 370/352 |
| 8,644,704 B2 * | 2/2014 | Vassilieva | H04J 14/0221 398/25 |
| 8,744,265 B2 * | 6/2014 | Effenberger | H04B 10/272 398/14 |
| 9,054,830 B2 * | 6/2015 | Gadkari | H04J 14/0226 |
| 2003/0002100 A1 | 1/2003 | Izadpanah | |
| 2003/0163831 A1 * | 8/2003 | Gall | H04N 7/17309 725/127 |
| 2004/0100929 A1 * | 5/2004 | Garcia-Luna-Aceves | H04W 72/1278 370/338 |
| 2008/0267627 A1 | 10/2008 | Effenberger | |
| 2009/0046593 A1 * | 2/2009 | Ptasinski | H04L 1/0003 370/252 |
| 2014/0369689 A1 * | 12/2014 | Gadkari | H04L 5/08 398/67 |
| 2015/0365190 A1 * | 12/2015 | Wen | H04J 14/0246 398/67 |

* cited by examiner

| Channel Numbers | | $\lambda_{ui}$ | $\lambda_{u0}$ | $\lambda_{u1}$ | $\lambda_{u2}$ | $\lambda_{u3}$ | $\lambda_{u4}$ | $\lambda_{u5}$ | $\lambda_{u6}$ | $\lambda_{u7}$ | $\lambda_{u8}$ | $\lambda_{u9}$ | $\lambda_{u10}$ | $\lambda_{u11}$ | $\lambda_{u12}$ | $\lambda_{u13}$ | $\lambda_{u14}$ | $\lambda_{u15}$ | $\lambda_{u16}$ | $\lambda_{u17}$ |
|---|---|---|---|---|---|---|---|---|---|---|---|---|---|---|---|---|---|---|---|---|
| | | $\alpha_i$ | 0 | 1 | 2 | 3 | 4 | 5 | 6 | 7 | 8 | 9 | 10 | 11 | 12 | 13 | 14 | 15 | 16 | 17 |
| Intrinsic Wavelengths | | $C_i$ | 0 | 1 | 2 | 3 | 4 | 0 | 1 | 2 | 3 | 4 | 0 | 1 | 2 | 3 | 4 | 0 | 1 | 2 |
| | | $\lambda_{uin}$ | $\lambda_{uinA}$ | | $\lambda_{uinB}$ | | | | $\lambda_{uinC}$ | $\lambda_{uinD}$ | | | $\lambda_{uinE}$ | | | | | | | |
| Access Points and Corresponding Wavelengths | A | | | $\lambda_{u1}$ | $\lambda_{u2}$ | $\lambda_{u3}$ | $\lambda_{u4}$ | $\lambda_{u5}$ | | | | | | | | | | | | |
| | B | | | | | $\lambda_{u3}$ | $\lambda_{u4}$ | $\lambda_{u5}$ | $\lambda_{u6}$ | $\lambda_{u7}$ | | | | | | | | | | |
| | C | | | | | | | | | $\lambda_{u7}$ | $\lambda_{u8}$ | $\lambda_{u9}$ | $\lambda_{u10}$ | $\lambda_{u11}$ | | | | | | |
| | D | | | | | | | | | | $\lambda_{u8}$ | $\lambda_{u9}$ | $\lambda_{u10}$ | $\lambda_{u11}$ | $\lambda_{u12}$ | | | | | |
| | E | | | | | | | | | | | | $\lambda_{u10}$ | $\lambda_{u11}$ | $\lambda_{u12}$ | $\lambda_{u13}$ | $\lambda_{u14}$ | | | |

*FIG. 4*

MODULO CHANNEL ASSIGNMENT TECHNIQUE IN OPTICAL POINT TO MULTIPOINT NETWORKS TO PREVENT OPTICAL BEAT INTERFERENCE

CROSS-REFERENCE TO RELATED APPLICATION

Referring to the application data sheet filed herewith, this application claims a benefit of priority under 35 U.S.C. 119(e) from copending provisional patent application U.S. Ser. No. 62/023,279, filed Jul. 11, 2014, the entire contents of which are hereby expressly incorporated herein by reference for all purposes.

BACKGROUND

Optical point to multipoint networks are well known the field of communications networking. Optical beat interference (OBI) is an important performance impairment effect due to collision of optical signals from two or more optical transmitters with the same wavelength that are simultaneously received by a single shared optical receiver. What is needed is a technology to prevent collision of optical signals at the single shared optical receiver to solve the problem of optical beat interference.

SUMMARY

There is a need for the following embodiments of the present disclosure. Of course, the present disclosure is not limited to these embodiments.

According to an embodiment of the present disclosure, a process comprises: configuring an optical point to multipoint communication network including assigning a channel number $C_i$ by modulo-N arithmetic to each of a plurality of N access points, each of the plurality of N access points i) including a laser and ii) coupled to a hub having a shared optical receiver; and tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver. According to another embodiment of the present disclosure, a machine comprises: an optical point to multipoint communication network including a hub including a shared optical receiver; and a plurality of N access points optically coupled to the hub, each of the plurality of N access points including a laser, wherein each of the plurality of N access points is assigned a channel number $C_i$ by modulo-N arithmetic and wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well known techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Figure 1:
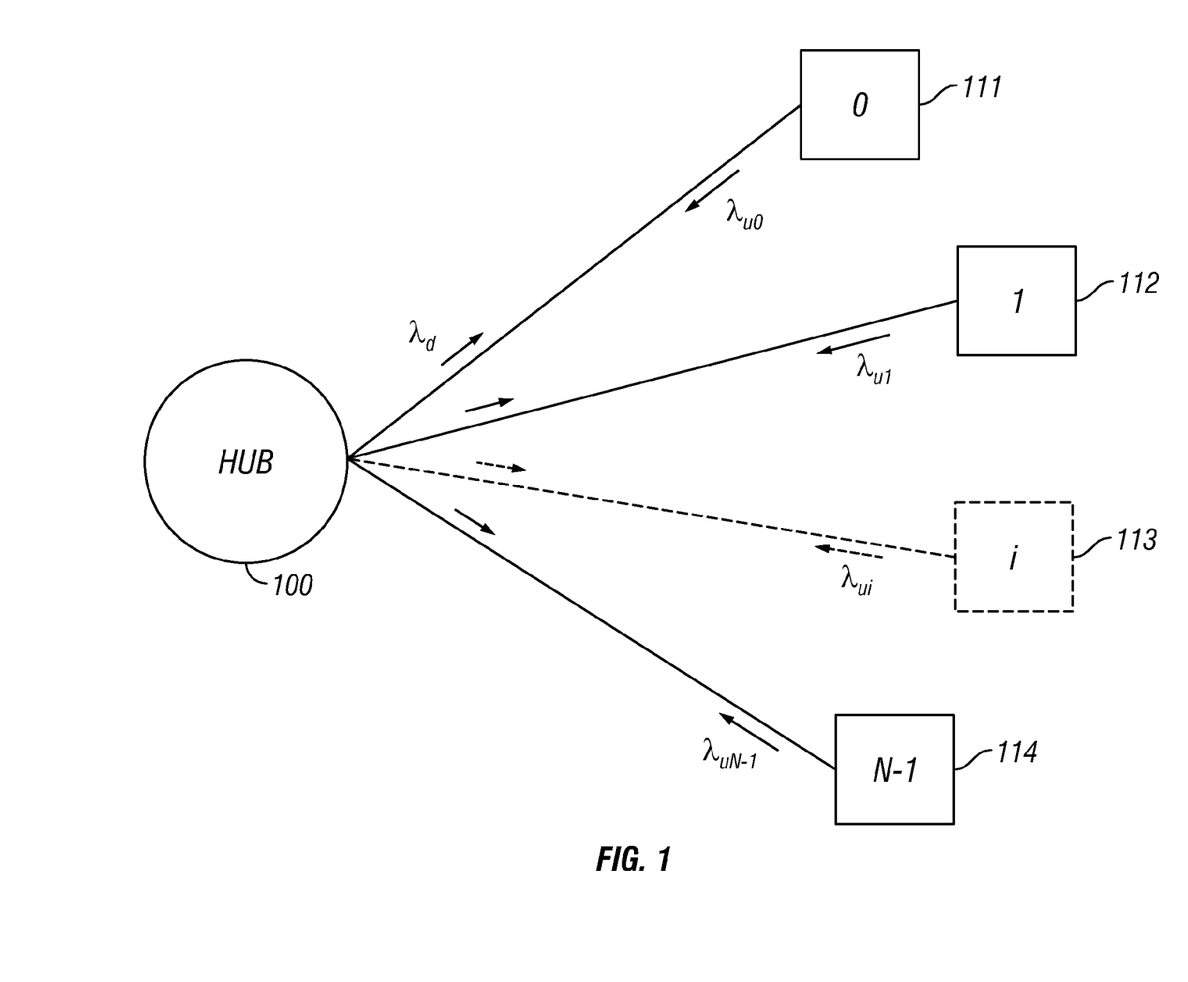
FIG. 1 is a block schematic view of an optical point to multipoint access network.

Referring to FIG. 1, a hub 100 is optically coupled to a plurality of access points 111, 112, 113, 114. The hub can include a shared optical receiver. Each of the access points can include an optical transmitter, such as a laser. For instance, the optical couplings can include optic fiber and support time domain multiple access (TDMA) and/or frequency domain multiple access (FDMA) data communications.

In an optical point-to-multipoint access network architecture that employs both time domain multiple access (TDMA) and frequency domain multiple access (FDMA) simultaneously and a single optical receiver is being shared by multiple optical transmitters, it is necessary to use multiple wavelengths for the transmitters to avoid optical beat interference. In this network architecture RF modulated optical bursts are being transmitted to a shared receiver at the hub by all the access points. Since both TDMA and FDMA is being used by the access points to communicate to the hub, two or more transmitters can use the same time slot to transmit optical burst signals modulated at different radio frequency channels. This can create optical beat interference (OBI) at the receiver.

One way to avoid OBI at the receiver is to control and assign different wavelengths to the access point transmitters.

This can be done by stabilizing the laser wavelength by controlling its temperature and assigning a specific wavelength to each access point from a set of N wavelengths $\{\lambda_{u0}, \lambda_{u2} \ldots \lambda_{uN-1}\}$, where N is the number of access points sharing one receiver. The wavelength can be selected locally by an N-Position switch or set remotely through a communication channel.

Figure 2:
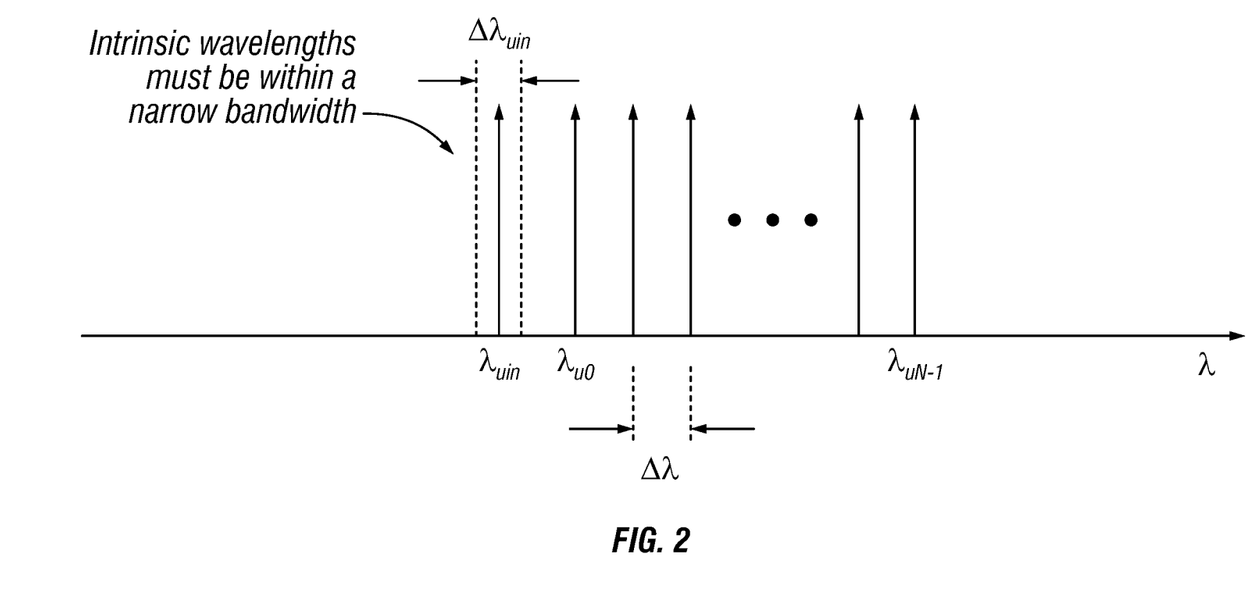
FIG. 2 is a schematic spectral view of tuning a laser to a specific set of N wavelengths.

Due to distribution of laser intrinsic wavelengths (laser wavelength at room temperature, $\lambda_{uin}$), laser operating temperature and the minimum wavelength spacing ($\Delta\lambda = \lambda_{ui} - \lambda_{ui-1}$) required for OBI-free performance, it may be impossible to find any set of N wavelengths that every given laser within a CWDM band can be tuned into. In other words as FIG. 2 shows, to tune the access point lasers to a specific set of N wavelengths, the intrinsic wavelengths must be within a narrow bandwidth of $\Delta\lambda_{uin}$. This can be a couple of nanometers in practical applications. This limitation on intrinsic wavelength increases cost of the laser.

Figure 3:
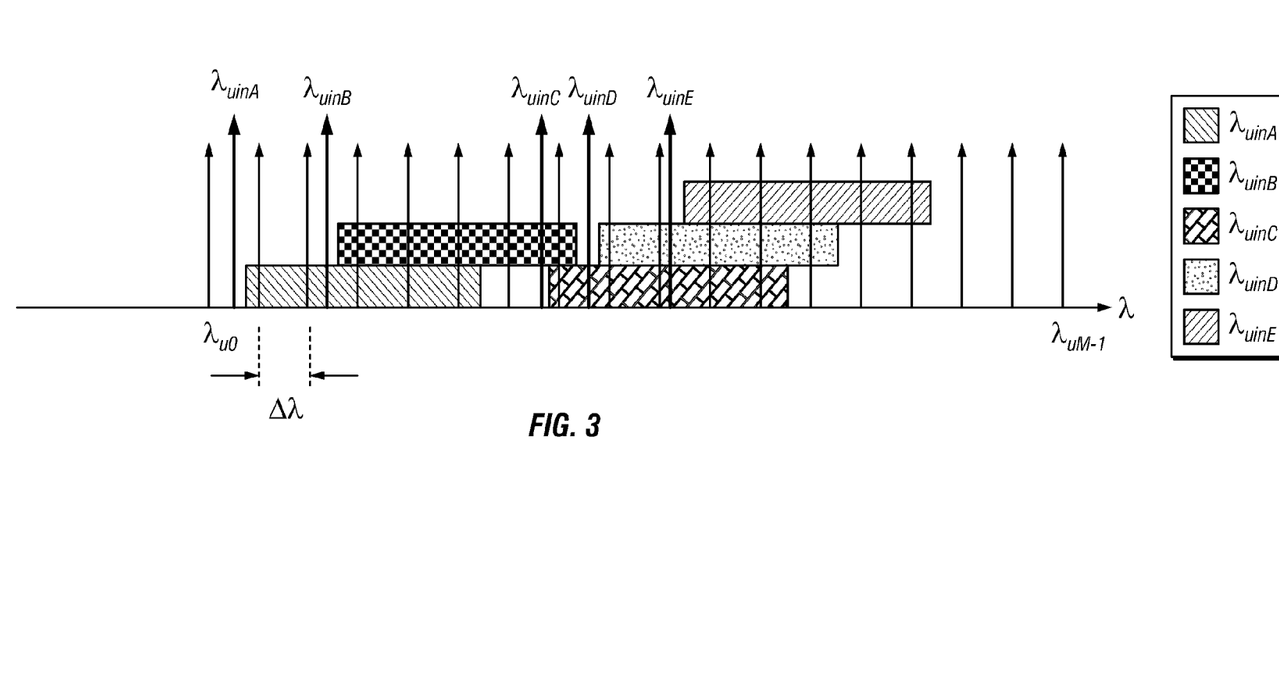
FIG. 3 is a schematic spectral view of a larger set of wavelengths to include all possible intrinsic wavelengths.

To overcome the above limitation, embodiments of this disclosure can define a larger set of M wavelengths $\{\lambda_{u0}, \lambda_{u2} \ldots \lambda_{uM-1}\}$ which includes the whole coarse wavelength division multiplexing (CWDM) band or all possible wavelengths that can be tuned into. In this new approach as it is shown in FIG. 3, for every given laser a subset of N wavelength can be found which the laser can be tuned into. These subsets of wavelengths are marked with unique patterns in FIG. 3. In practical cases this subset of N includes longer wavelengths above the intrinsic wavelength.

As can be seen in FIG. 3 the subsets of N wavelengths may or may not overlap. Selection of a specific subset is only dependent on the access point laser intrinsic wavelength.

In order to avoid OBI, each access point laser must have a unique wavelength from the set of M wavelengths. This can be done by defining a proper channel numbering methodology and assigning a unique channel number to each access point.

This embodiment can define the channel number to be modulo N congruent to the sequential number for all possible wavelengths. In other words channel number $C_i$ defines as, $$C_i \equiv a_i (\bmod N) \qquad (1)$$

$C_i$ will be a number between 0 and N−1, N is the number of access points and $a^i$ is the sequential number of the wavelength $\lambda_{ui}$ and can be calculated by, $$a_i = \frac{\lambda_{ui} - \lambda_{u0}}{\Delta\lambda} \qquad (2)$$

In equation (2), $\lambda_{u0}$ is the first wavelength and $\Delta\lambda$ is the channel spacing in the set of M wavelengths.

Figure 4:
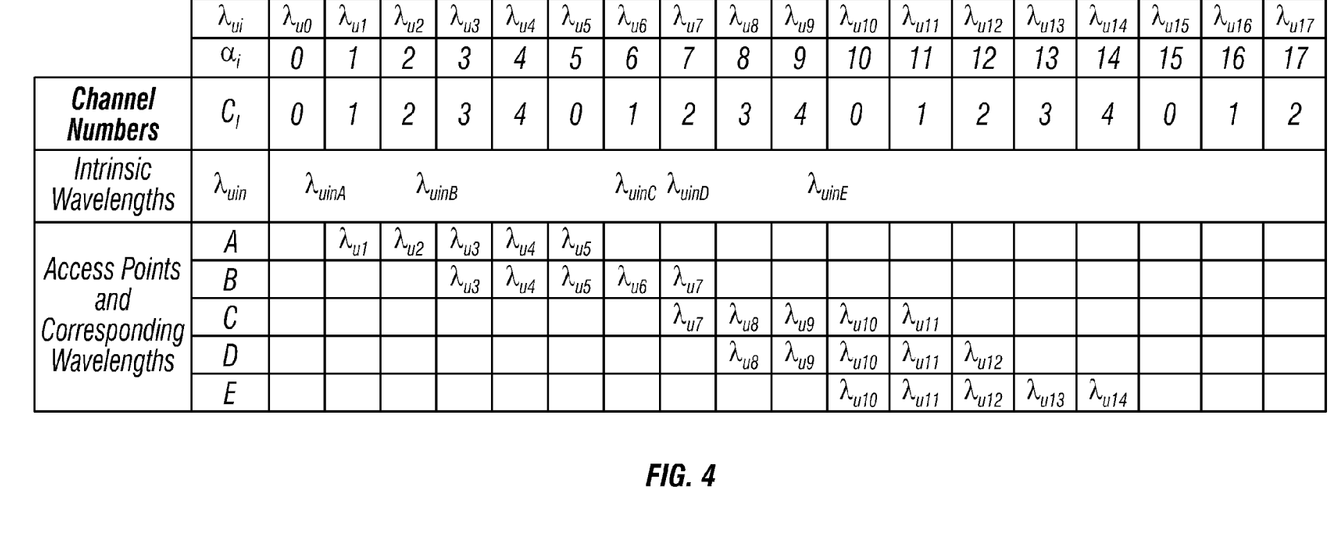
FIG. 4 is a view of Table 1 depicting channel numbers for an embodiment where a number of wavelengths M=18 and a number of access points N=5.

Referring to FIG. 4, Table 1 shows the channel numbers assigned to the set of M wavelengths as well as corresponding wavelengths for access points with arbitrary intrinsic wavelengths of $\lambda_{uinA}$ through $\lambda_{uinE}$. As can be seen in Table 1, regardless of intrinsic wavelengths of the lasers, similar or overlapping wavelengths at each access point have the same channel numbers and hence the OBI can be avoided only by tuning each laser to a unique channel number. It is worth noting that due to the distribution of intrinsic wavelengths two or more access points can be found that have different wavelengths for similar channel number.

Although the above description of emphasizes the restriction of tunability of the lasers due to distribution of intrinsic wavelength, the method is applicable where the laser is not tunable to entire band due to restrictions. There are other formulas that provide modulo channel numbering similar to what described above by equations (1) and (2). In the below examples are more embodiments.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Example 1

In this embodiment, the channel number $C_i$ is defined by:

$$C_i = \lfloor |f(a_i)| \rfloor (\bmod N) \qquad (3)$$

Where $f$ is any monotonically increasing function, $\lfloor |f(a_i)| \rfloor$ is integer part of the absolute value of $f(a_i)$ and $a_i$ is defined by equation (2).

Examples of such channel numbering equations are:

$$C_i = \lfloor |\pi + (a_i)^3| \rfloor (\bmod N)$$

$$C_i = \lfloor 10^{abs[(a_i)]} \rfloor (\bmod N)$$

Example 2

In this embodiment, the channel number $C_i$ is defined by:

$$C_i = \lfloor |g(a_i)| \rfloor (\bmod N) \qquad (4)$$

Where g is any monotonically decreasing function and $\lfloor |g(a_i)| \rfloor$ is integer part of the absolute value of $g(a_i)$ and $a_i$ is defined by equation (2).

Examples of such channel numbering equations are:

$$C_i = \lfloor |3 - (a_i)^5| \rfloor (\bmod N)$$

$$C_i = \lfloor |1 - e^{abs[(a_i)]}| \rfloor (\bmod N)$$

Example 3

In this embodiment, the channel number $C_i$ is defined by:

$$C_i = p_N[a_i(\bmod N)] \qquad (5)$$

Where $p_N$ is any cyclic permutation of $\{0, 1, 2 \ldots N-1\}$ and $a_i$ is defined by equation (2).

For example, for N=4, one such cyclic permutation is defined by:

$$p_4(0) = 2$$

$$p_4(1) = 0$$

$$p_4(2) = 3$$

$$p_4(3) = 1$$

Example 4

In this embodiment, the channel number $C_i$ is defined by:

$$C_i = p_N[\lfloor |f(a_i)| \rfloor (\bmod N)] \qquad (6)$$

Where $p_N$ is any cyclic permutation of $\{0, 1, 2 \ldots N-1\}$ and $f$ is any monotonically increasing function and $a_i$ is defined by equation (2).

Examples of such channel numbering equations are:

$$C_i = p_N(\lfloor |\pi + (a_i)^3| \rfloor (\bmod N))$$

$$C_i = p_N(\lfloor 10^{abs[(a_i)]} \rfloor (\bmod N))$$

The functions $f$ and $p_N$ can be chosen so that the final distribution of wavelengths among the N channels is uniform even if the original distribution of wavelengths were not uniform.

Example 5

In this embodiment, the channel number $C_i$ is defined by:

$$C_i = p_N[\lfloor |g(a_i)| \rfloor (\bmod N)] \qquad (7)$$

Where $p_N$ is any cyclic permutation of $\{0, 1, 2 \ldots N-1\}$ and g is any monotonically decreasing function and $a_i$ is defined by equation (2).

Examples of such channel numbering equations are:

$$C_i = p_N[\lfloor |3 - (a_i)^5| \rfloor (\bmod N)]$$

$$C_i = p_N[\lfloor |-e^{abs[(a_i)]}| \rfloor (\bmod N)]$$

CONCLUSION

Embodiments can include a Channel Assignment methodology as described herein to prevent wavelength collision in a wavelength multiplexed optical network. This method can guarantee collision free operation by assigning different wavelengths to the lasers without imposing any restriction on the tunability of the lasers. In other words, this method can make it possible to use lasers that are tunable within non similar (or overlapping) bands in a wavelength multiple networks.

Generic embodiments can include channel assignment in which wavelength tunable lasers with non-similar or overlapping tunability can be used in a wavelength multiplexed optical network.

In a sub-generic embodiment, the channel number can be assigned by modulo-N arithmetic as explained by equations (1) and (2). In an alternative sub-generic embodiment, the channel number can be assigned by modulo-N arithmetic and any monotonically increasing function as explained by equations (3) and (2). In an alternative sub-generic embodiment, the channel number can be assigned by modulo-N arithmetic and any monotonically decreasing function as explained by equations (4) and (2). In an alternative sub-generic embodiment, the channel number can be assigned by modulo-N arithmetic and any cyclic permutation of $\{0, 1, 2 \ldots N-1\}$ as explained by equations (5) and (2). In an alternative sub-generic embodiment, the channel number can be assigned by modulo-N arithmetic, any monotonically increasing function and any cyclic permutation of $\{0, 1, 2 \ldots N-1\}$ as explained by equations (6) and (2). In an alternative sub-generic embodiment, the channel number can be assigned by modulo-N arithmetic, any monotonically decreasing function and any cyclic permutation of $\{0, 1, 2 \ldots N-1\}$ as explained by equations (7) and (2).

DEFINITIONS

The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase ultrasonic frequency is intended to mean frequencies greater than or equal to approximately 20 KHz. The phrase radio frequency (RF) is intended to mean frequencies less than or equal to approximately 300 GHz as well as the infrared spectrum. The term light is intended to mean frequencies greater than or equal to approximately 300 GHz as well as the microwave spectrum.

The term uniformly is intended to mean unvarying or deviate very little from a given and/or expected value (e.g, within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean shipping, installing, configuring, testing, operating and/or maintaining.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or.

Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations. The individual components need not be fabricated from the disclosed materials, but could be fabricated from any and all suitable materials.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising configuring an optical point to multipoint communication network including
assigning a channel number $C_i$ by modulo-N arithmetic to each of a plurality of N access points, each of the plurality of N access points i) including a laser and ii) coupled to a hub having a shared optical receiver; and
tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $$C_i \equiv a_i (\bmod N)$$

wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

2. A method, comprising configuring an optical point to multipoint communication network including
assigning a channel number $C_i$ by modulo-N arithmetic to each of a plurality of N access points, each of the plurality of N access points i) including a laser and ii) coupled to a hub having a shared optical receiver; and
tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $$C_i = \lfloor |f(a_i)| \rfloor (\bmod N)$$

wherein $f$ is a monotonically increasing function, $\lfloor |f(a_i)| \rfloor$ is integer part of the absolute value of $f(a_i)$ and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

3. A method, comprising configuring an optical point to multipoint communication network including
assigning a channel number $C_i$ by modulo-N arithmetic to each of a plurality of N access points, each of the plurality of N access points i) including a laser and ii) coupled to a hub having a shared optical receiver; and
tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $$C_i = \lfloor |g(a_i)| \rfloor (\bmod N)$$

wherein $g$ is a monotonically decreasing function and $\lfloor |g(a_i)| \rfloor$ is integer part of the absolute value of $g(a_i)$ and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

4. A method, comprising configuring an optical point to multipoint communication network including
assigning a channel number $C_i$ by modulo-N arithmetic to each of a plurality of N access points, each of the plurality of N access points i) including a laser and ii) coupled to a hub having a shared optical receiver; and
tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $$C_i = p_N[a_i (\bmod N)]$$

wherein $p_N$ is a cyclic permutation of $\{0, 1, 2 \ldots N-1\}$ and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

5. A method, comprising configuring an optical point to multipoint communication network including
   assigning a channel number $C_i$ by modulo-N arithmetic to each of a plurality of N access points, each of the plurality of N access points i) including a laser and ii) coupled to a hub having a shared optical receiver; and
   tuning the laser located in each of the plurality of N access points to a wavelength $\lambda_{ui}$ that is one of a set of M wavelengths as a function of the channel number assigned to the access point in which the laser is located, a channel spacing $\lambda\Delta$ and an intrinsic wavelength $\lambda_{uin}$ of the laser to prevent optical beat interference at the shared optical receiver,
wherein the channel number $C_i = p_N[\lfloor |f(a_i)| \rfloor(\bmod N)]$ wherein $p_N$ is a cyclic permutation of $\{0, 1, 2 \ldots N-1\}$ and $f$ is a monotonically increasing function and
wherein $a_i$ is a sequential number of the wavelength $\lambda_{ui}$ and $$a_i = \frac{\lambda_{ui} - \lambda_{u0}}{\Delta\lambda}$$

wherein $\Delta\lambda_{u0}$ is the first wavelength and $\Delta\lambda$ is the channel spacing in the set of M wavelengths and $\Delta\lambda$ is greater than zero.

6. A method, comprising configuring an optical point to multipoint communication network including
   assigning a channel number $C_i$ by modulo-N arithmetic to each of a plurality of N access pointer each of the plurality of N access points i) including a laser and ii) coupled to a hub having a shared optical receiver; and
   tuning the laser located in each of the plurality of N access points to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $C_i = p_N[\lfloor |g(a_i)| \rfloor(\bmod N)]$ wherein $p_N$ is a cyclic permutation of $\{0, 1, 2 \ldots N-1\}$ and g is a monotonically decreasing function and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

7. An apparatus, comprising: an optical point to multipoint communication network including
   a hub including a shared optical receiver; and
   a plurality of N access points optically coupled to the hub, each of the plurality of N access points including a laser,
   wherein each of the plurality of N access points is assigned a channel number $C_i$ by modulo-N arithmetic and
   wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $C_i = a_i(\bmod N)$ wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

8. An apparatus, comprising: an optical point to multipoint communication network including
   a hub including a shared optical receiver; and
   a plurality of N access points optically coupled to the hub, each of the plurality of N access points including a laser,
   wherein each of the plurality of N access points is assigned a channel number $C_i$ by modulo-N arithmetic and
   wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $C_i = \lfloor |f(a_i)| \rfloor(\bmod N)$ wherein $f$ is a monotonically increasing function, $\lfloor |f(a_i)| \rfloor$ is integer part of the absolute value of $f(a_i)$ and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

9. An apparatus, comprising: an optical point to multipoint communication network including
   a hub including a shared optical receiver; and
   a plurality of N access points optically coupled to the hub, each of the plurality of N access points including a laser,
   wherein each of the plurality of N access points is assigned a channel number $C_i$ by modulo-N arithmetic and
   wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver,
wherein the channel number $C_i = \lfloor |g(a_i)| \rfloor(\bmod N)$ wherein g is a monotonically decreasing function and $\lfloor |g(a_i)| \rfloor$ is integer part of the absolute value of $g(a_i)$ and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

10. An apparatus, comprising: an optical point to multipoint communication network including
- a hub including a shared optical receiver; and
- a plurality of N access points optically coupled to the hub, each of the plurality of N access points including a laser,
  - wherein each of the plurality of N access points is assigned a channel number $C_i$ by modulo-N arithmetic and
  - wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver, wherein the channel number $C_i = p_N[a_i(\mod N)]$ wherein $p_N$ is a cyclic permutation of $\{0, 1, 2 \ldots N-1\}$ and wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

11. An apparatus, comprising: an optical point to multipoint communication network including
- a hub including a shared optical receiver; and
- a plurality of N access points optically coupled to the hub, each of the plurality of N access points including a laser,
  - wherein each of the plurality of N access points is assigned a channel number $C_i$ by modulo-N arithmetic and
  - wherein the laser located in each of the plurality of N access points is tuned to a wavelength $\lambda_{ui}$ that is one of a set of M wavelengths as a function of the channel number assigned to the access point in which the laser is located, a channel spacing $\Delta\lambda$ and an intrinsic wavelength $\lambda_{uin}$ of the laser to prevent optical beat interference at the shared optical receiver, wherein the channel number $C_i = p_N[\lfloor |f(a_i)| \rfloor (\mod N)]$ wherein $p_N$ is a cyclic permutation of $\{0, 1, 2 \ldots N-1\}$ and $f$ is a monotonically increasing function and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

12. An apparatus, comprising: an optical point to multipoint communication network including
- a hub including a shared optical receiver; and
- a plurality of N access points optically coupled to the hub, each of the plurality of N access points including a laser,
  - wherein each of the plurality of N access points is assigned a channel number $C_i$ by modulo-N arithmetic and
  - wherein the laser located in each of the plurality of N access points is tuned to a wavelength $\lambda_{ui}$ that is one of a set of M wavelengths as a function of the channel number assigned to the access point in which the laser is located a channel spacing $\Delta\lambda$ and an intrinsic wavelength $\lambda_{uin}$ of the laser to prevent optical beat interference at the shared optical receiver, wherein the channel number $C_i = p_N[\lfloor |g(a_i)| \rfloor (\mod N)]$ wherein $p_N$ is a cyclic permutation of $\{0, 1, 2 \ldots N-1\}$ and g is a monotonically decreasing function and
wherein $a_i$ is a sequential number of the wavelength $\lambda_{ui}$ and $$a_i = \frac{\lambda_{ui} - \lambda_{u0}}{\Delta\lambda}$$

wherein $\lambda_{u0}$ is the first wavelength and $\Delta\lambda$ is the channel spacing in the set of M wavelengths and $\Delta\lambda$ is greater than zero.

* * * * *